(12) United States Patent
Rogers et al.

(10) Patent No.: US 9,642,212 B1
(45) Date of Patent: May 2, 2017

(54) ELECTROLUMINESCENT SYSTEM AND PROCESS

(71) Applicant: Darkside Scientific, LLC, Medina, OH (US)

(72) Inventors: Trent Rogers, Castlereagh (AU); Steve Galayda, Lodi, OH (US); Shawn J. Mastrian, Austin, TX (US); Pete Gonzales, Medina, OH (US)

(73) Assignee: DARKSIDE SCIENTIFIC, LLC, Medina, OH (US)

( * ) Notice: Subject to any disclaimer, the term of this patent is extended or adjusted under 35 U.S.C. 154(b) by 0 days.

(21) Appl. No.: 15/222,444

(22) Filed: Jul. 28, 2016

Related U.S. Application Data

(63) Continuation-in-part of application No. 14/736,936, filed on Jun. 11, 2015, now abandoned.

(51) Int. Cl.
*H05B 33/14* (2006.01)
*C09D 5/24* (2006.01)
(Continued)

(52) U.S. Cl.
CPC ............ *H05B 33/14* (2013.01); *C09D 5/22* (2013.01); *C09D 5/24* (2013.01); *C09D 133/02* (2013.01);
(Continued)

(58) Field of Classification Search
CPC ........ H05B 33/10; H05B 33/12; H05B 33/14; H05B 33/28; C09D 5/22; C09D 5/24; C09D 133/00; C09D 133/02
See application file for complete search history.

(56) References Cited

U.S. PATENT DOCUMENTS

| 3,981,820 A | * | 9/1976 | Miller | ........... C09D 5/22 106/287.34 |
| 3,995,157 A | | 11/1976 | Holub et al. | |

(Continued)

FOREIGN PATENT DOCUMENTS

| DE | 1159091 B | 12/1963 |
| EP | 1110816 A2 | 6/2001 |

(Continued)

OTHER PUBLICATIONS

Brochure, "Spherical Light Coating," www.xtra-dynamics.com, captured by www.archive.org Sep. 14, 2008, visited Mar. 29, 2012. German-language brochure with attached machine-translation to English.

(Continued)

*Primary Examiner* — Anne Hines
(74) *Attorney, Agent, or Firm* — James R. Eley; Ronald J. Koch; Eley Law Firm Co LPA

(57) ABSTRACT

A system and method for producing a conformal electroluminescent coating on an object wherein an electrically conductive base backplane film layer is applied upon a substrate. One or more intermediate layers, such as dielectric, or phosphor film layers, is/are applied upon the conductive backplane film layer. An electrode film layer is applied upon the one or more intermediate layers using a substantially transparent, electrically conductive material. The electroluminescent phosphor is excitable by an electrical field established across the phosphor film layer such that the device emits electroluminescent light upon application of an electrical charge between the conductive backplane film layer and the electrode film layer.

55 Claims, 3 Drawing Sheets

(51) Int. Cl.
    C09D 5/22      (2006.01)
    C09D 181/08    (2006.01)
    C09D 165/00    (2006.01)
    C09D 133/02    (2006.01)
    C09D 175/04    (2006.01)
    H05B 33/10     (2006.01)
    H05B 33/28     (2006.01)
(52) U.S. Cl.
    CPC ......... *C09D 165/00* (2013.01); *C09D 175/04* (2013.01); *C09D 181/08* (2013.01); *H05B 33/10* (2013.01); *H05B 33/28* (2013.01)

(56) References Cited

U.S. PATENT DOCUMENTS

| | | | |
|---|---|---|---|
| 4,159,559 A | 7/1979 | Robinson, Sr. | |
| 4,725,344 A | 2/1988 | Yocom et al. | |
| 5,030,833 A | 7/1991 | Nozaka et al. | |
| 5,491,377 A | 2/1996 | Janusauskas | |
| 5,780,965 A | 7/1998 | Cass et al. | |
| 5,968,415 A * | 10/1999 | Cho | C03C 17/009 252/301.36 |
| 6,123,455 A | 9/2000 | Beshears et al. | |
| 6,193,908 B1 | 2/2001 | Hampden-Smith et al. | |
| 6,538,725 B2 | 3/2003 | Potyrailo et al. | |
| 6,593,687 B1 | 7/2003 | Pei et al. | |
| 6,639,355 B1 | 10/2003 | Pennaz et al. | |
| 6,835,112 B2 | 12/2004 | Tanabe et al. | |
| 6,926,972 B2 * | 8/2005 | Jakobi | C09D 5/22 313/504 |
| 6,965,196 B2 | 11/2005 | Murasko et al. | |
| 7,168,838 B2 | 1/2007 | Moser | |
| 7,258,587 B2 | 8/2007 | Hwang | |
| 7,412,088 B2 | 8/2008 | Kuramata et al. | |
| 7,439,672 B2 | 10/2008 | Enz | |
| 7,698,842 B2 | 4/2010 | Fitzke et al. | |
| 7,910,400 B2 | 3/2011 | Kwon et al. | |
| 8,470,388 B1 | 6/2013 | Zsinko et al. | |
| 2003/0022018 A1 | 1/2003 | Baumberg et al. | |
| 2003/0122106 A1 | 7/2003 | Irvin et al. | |
| 2004/0080256 A1 * | 4/2004 | Hampden-Smith | B01J 2/003 313/467 |
| 2004/0109951 A1 | 6/2004 | Irvin et al. | |
| 2004/0183434 A1 | 9/2004 | Yeh et al. | |
| 2005/0062395 A1 | 3/2005 | Takahashi et al. | |
| 2005/0067952 A1 | 3/2005 | Fechter et al. | |
| 2005/0179367 A1 | 8/2005 | Krohn et al. | |
| 2005/0191520 A1 | 9/2005 | Guntermann et al. | |
| 2006/0132028 A1 | 6/2006 | Anderson | |
| 2009/0096351 A1 | 4/2009 | Hampden-Smith et al. | |
| 2009/0104350 A1 | 4/2009 | Osawa | |
| 2009/0212690 A1 | 8/2009 | Bruton et al. | |
| 2009/0236984 A1 | 9/2009 | Werners et al. | |
| 2009/0252933 A1 | 10/2009 | Free et al. | |
| 2010/0209724 A1 | 8/2010 | Hartmann et al. | |
| 2010/0289010 A1 | 11/2010 | Cho et al. | |
| 2011/0050094 A1 | 3/2011 | Enz et al. | |
| 2013/0313542 A1 | 11/2013 | Hakii et al. | |
| 2015/0001498 A1 * | 1/2015 | Cho | H01L 51/0054 257/40 |

FOREIGN PATENT DOCUMENTS

| | | |
|---|---|---|
| EP | 2334151 A1 | 6/2011 |
| JP | 11162633 A | 6/1999 |
| WO | 2010131171 A2 | 11/2010 |

OTHER PUBLICATIONS

James Deardorff, "Shining a Black Light on Coating Inspections," www.photonics.com, Nov. 1, 2010, visited Mar. 28, 2012.
International Search Report, Patent Cooperation Treaty Application No. PCT/IB2013/050037, mailed Jun. 19, 2013.
Partial European Search Report, Application EP13733692, mailed Jun. 16, 2015.

* cited by examiner

ELECTROLUMINESCENT SYSTEM AND PROCESS

This application is continuation-in-part of U.S. patent application Ser. No. 14/736,936, filed Jun. 11, 2015, the entire content of this application being hereby incorporated by reference as if fully rewritten herein.

FIELD

The present invention relates to a process for producing electroluminescent systems having a lower backplane electrode layer and an upper electrode layer, the lower and upper electrode layers being connectable to an electrical driving circuit. One or more functional layers are disposed between the lower and upper electrode layers to form at least one electroluminescent area.

BACKGROUND

Since the 1980s, electroluminescent (EL) technology has come into widespread use in display devices where its relatively low power consumption, relative brightness and ability to be formed in relatively thin-film configurations have shown it to be preferable to light emitting diodes (LEDs) and incandescent technologies for many applications.

Commercially manufactured EL devices have traditionally been produced using doctor blade coating and printing processes such as screen printing or, more recently, ink jet printing. For applications that require relatively planar EL devices these processes have worked reasonably well, as they lend themselves to high-volume production with relatively efficient and reliable quality control.

However, traditional processes are inherently self-limiting for applications where it is desirable to apply an EL device to a surface having complex contoured topologies, such as convex, concave and reflexed surfaces. Partial solutions have been developed wherein a relatively thin-film EL decal is applied to a surface, the decal being subsequently encapsulated within a polymer matrix. While moderately successful, this type of solution has several inherent weaknesses. Firstly, while decals can acceptably conform to mild concave/convex topologies, they are incapable of conforming to tight-radius curves without stretching or wrinkling. In addition, the decal itself does not form either a chemical or mechanical bond with an encapsulating polymer, essentially remaining a foreign object embedded within the encapsulating matrix. These weaknesses pose difficulties in both manufacturing and product life-cycle, as embedded-decal EL lamps applied to complex topologies are difficult to produce and are susceptible to delamination arising from mechanical stresses, thermal stresses and long-term exposure to ultraviolet (UV) light.

SUMMARY

A process is disclosed according to an embodiment of the present invention whereby an EL device is "painted" onto a surface, i.e., substrate, of a target item to which the EL device is to be applied. The present invention is applied to the substrate in a series of layers, with each layer performing a specific function.

In the various embodiments described herein, a spray-applied conformal coating comprises the following components, included in the various layers in differing amounts as disclosed herein: a conductive component, a reducer solvent component to assist in the deposition and post-deposition flow, a high-dielectric pigment component, an electroluminescent pigment component, and a film-forming binder component that forms a film that flows evenly and consistently when atomized onto the surface of an object; the various components being sometimes described in conjunction with a layer (e.g. outer layer conductive component);

One embodiment comprises an inherently conductive and substantially transparent outer layer comprising the conductive component, the reducer solvent component, and the binder component; an inherently conductive inner layer comprising the reducer solvent component, the binder component, and the conductive component; a first intermediate layer, being disposed between the inner and outer layers, and further comprising, the reducer solvent component, the binder component, and the high-dielectric pigment component, said first intermediate layer being adapted to insulate said outer layer from said inner layer, where the film flows to a smooth film that completely covers the inner layer so as not to allow a direct electrical connection between conductive layers; and a second intermediate layer, being disposed between the inner and outer layers, and further comprising the reducer solvent component, the binder component, the electroluminescent pigment component, said second intermediate layer being adapted to flow after deposition in a manner where the electroluminescent pigment is dispersed in an even and uniform layer as the film cures to provide a uniform lighting effect when energized.

In one embodiment, a spray-applied conformal coating comprises an inherently conductive and substantially transparent outer layer; an inherently conductive inner layer; a first intermediate layer, being disposed between the inner and outer layers; and a second intermediate layer, being disposed between the inner and outer layers.

The inherently conductive and substantially transparent outer layer comprises 2-12% by weight of an inherently conductive polymer component, such as PEDOT:PSS or other inherently conductive polymer, typically 3%-5%; 55-80% by weight of a reducer solvent component, typically 70-75%, to assist in the deposition and post-deposition flow of the outer layer, with said reducer solvent being functionally compatible with the chosen binder system and, potentially, the inherently conductive polymer, and the reducer component including any one or more of toluene, xylene, acetone, naphtha, mineral spirits, methyl ethyl ketone, acetone, water, ethanol, isopropyl alcohol, n-butyl alcohol, methanol, ethyl benzene, cumene, Solane, n-propyl acetate, methyl acetate, methyl cyclohexane, p-Trifluoromethylphenyl chloride, and p-Chlorobenzotrifluoride, or other volatile solvent, typically in the ratio of 15-%30% by weight ethanol, 15-25% by weight methyl acetate, 15-25% by weight p-Chlorobenzotrifluoride, and 15-25% by weight water; and 10-30% by weight of a film-forming binder component, preferably 10-15%, which is compatible with the inherently conductive polymer and forms a film that flows evenly and consistently when atomized onto the surface of an object, with said binder component including any one or more of an acrylic, polyurethane, vinyl, latex, cellulose acetate butyrate or other binder, preferably a polyurethane or acrylic. The outer layer has a thickness in the range of 0.0002" to 0.0006", typically 0.0005", and a resistivity of less than 2000 ohm/square meter.

The inherently conductive inner layer comprises 40-75% by weight of said reducer solvent component, typically 55%-65%, with the reducer solvent being typically either 50-70% n-butyl acetate and 30-50% xylene or 50-70% methyl acetate and 30-50% xylene; 20-35% by weight of said binder component, typically 20-25%, and preferably an acrylic or polyurethane binder; 20-50% by weight of a conductive pigment component, typically 30%-40%, where said conductive pigment component includes any one or more of silver flakes, silver nanowire, silver nanoparticles, copper flakes, copper nanowire, copper nanoparticles, nickel flakes, nickel nanowire, nickel nanoparticles, silver-coated copper flakes, silver-coated copper nanowire, carbon nanotubes, graphene, metal-coated particles, or other inherently conductive particles, typically silver flakes or silver-coated copper flakes. The inner layer has a thickness in the range of 0.0005" to 0.002", typically 0.001", and a resistivity of less than 20 ohm/square meter.

The first intermediate layer is disposed between the inner and outer layers, and further comprises 45-80% by weight of said reducer solvent component, typically 60%-65%, with the reducer solvent being typically either 50-70% n-butyl acetate and 30-50% xylene or 50-70% methyl acetate and 30-50% xylene; 10-35% by weight of said binder component, typically 15-20%, and preferably an acrylic or polyurethane binder; 20-50% by weight of a high-dielectric pigment component, typically 35%-45%, with said high-dielectric pigment component including any one or more of barium titanate, strontium titanate, titanium dioxide, lead zirconate titanate, tantalum oxide, aluminum oxide, or other high-dielectric solids. The first intermediate layer has a thickness in the range of 0.0005" to 0.002", typically 0.001", and is adapted to insulate said outer layer from said inner layer, where the film flows to a smooth film that completely covers the inner layer so as not to allow a direct electrical connection between conductive layers.

The second intermediate layer is disposed between the inner and outer layers, and further comprises 40-80% by weight of said reducer solvent component, typically 60%-65%, with the reducer solvent being typically either 50-70% n-butyl acetate and 30-50% xylene or 50-70% methyl acetate and 30-50% xylene; 10-35% by weight of said binder component, typically 15-20%, and preferably an acrylic or polyurethane binder; 20-50% by weight of an electroluminescent pigment component, typically 35%-45%, with said electroluminescent pigment component including any one or more of metal-doped zinc sulfide phosphors, metal-doped zinc selenide phosphors, metal-doped or native crystalline oxides such as Ga2O3, ZnGa2O4, CaGa2O4, Zn2SiO7, Zn2SiO4, Y2SIO5, and oxide phosphors of Sr, Ga, Ba, and Eu in some combination, or other electroluminescent phosphors. The electroluminescent pigment component has a thickness in the range of 0.001" to 0.003", typically 0.002", and is adapted to flow after deposition in a manner where the electroluminescent pigment is dispersed in an even and uniform layer as the film cures to provide a uniform lighting effect when energized.

In one embodiment, the outer layer transparent conductive component comprises said conductive pigment component, and has a thickness in the range of 0.001" to 0.002", and a resistivity of less than 100 ohm/square meter.

In one embodiment, the inner layer conductive component comprises an inherently conductive polymer, such as PEDOT:PSS or other inherently conductive polymer, and has a thickness in the range of 0.0002" to 0.001", and a resistivity of less than 2000 ohm/square meter.

In one embodiment, the first intermediate layer is disposed between said inner layer and said second intermediate layer, and said second intermediate layer is disposed between said outer layer and said first intermediate layer.

In one embodiment said first intermediate layer being and said second intermediate layer are blended into the same layer (a combined intermediate layer) and sprayed simultaneously, wherein said combined intermediate layer comprises, 40-80% by weight of said reducer solvent component, typically 60%-65%, with the reducer solvent being typically either 50-70% n-butyl acetate and 30-50% xylene or 50-70% methyl acetate and 30-50% xylene; 10-35% by weight of said binder component, typically 15-20%, and preferably an acrylic or polyurethane binder; 10-30% by weight of an electroluminescent pigment component, typically 15%-25%; 10-25% by weight of a high-dielectric pigment component, typically 15%-20%; and has a thickness in the range of 0.002" to 0.004", typically 0.002"; the combined intermediate layer being adapted to flow after deposition in a manner where the electroluminescent pigment is dispersed in an even and uniform layer as the film cures to provide a uniform lighting effect when energized, and where the film flows to a smooth film that completely covers the inner layer so as not to allow a direct electrical connection between conductive layers.

In one embodiment, the spray-applied conformal coating is applied by high pressure low volume spray techniques, where each coating is atomized by compressed air and deposited on the conformal substrate in this manner, and the coating then flows after deposition to the proper film thickness.

In one embodiment, the spray-applied conformal coating is applied by aerosol spray techniques, where each coating is atomized by a propellant inside the can, typically propane, and deposited on the conformal substrate in this manner, and the coating then flows after deposition to the proper film thickness.

In one embodiment, the spray-applied conformal coating is applied by electrostatic spray techniques, where each coating is atomized by compressed air and deposited on the charged surface of the conformal substrate in this manner, and the coating then flows after deposition to the proper film thickness.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
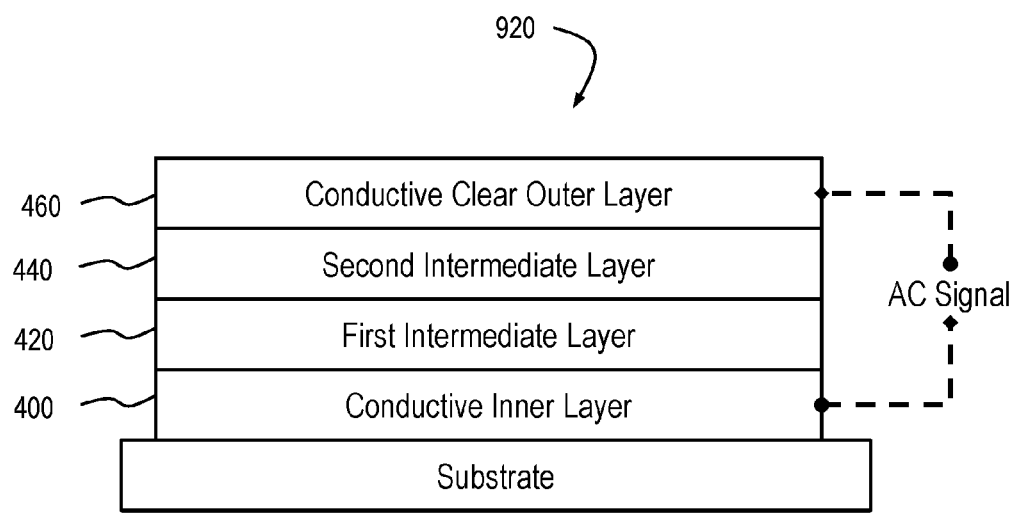
FIG. 1 is a schematic layer diagram of an EL lamp according to one embodiment of the present invention.
Figure 2:
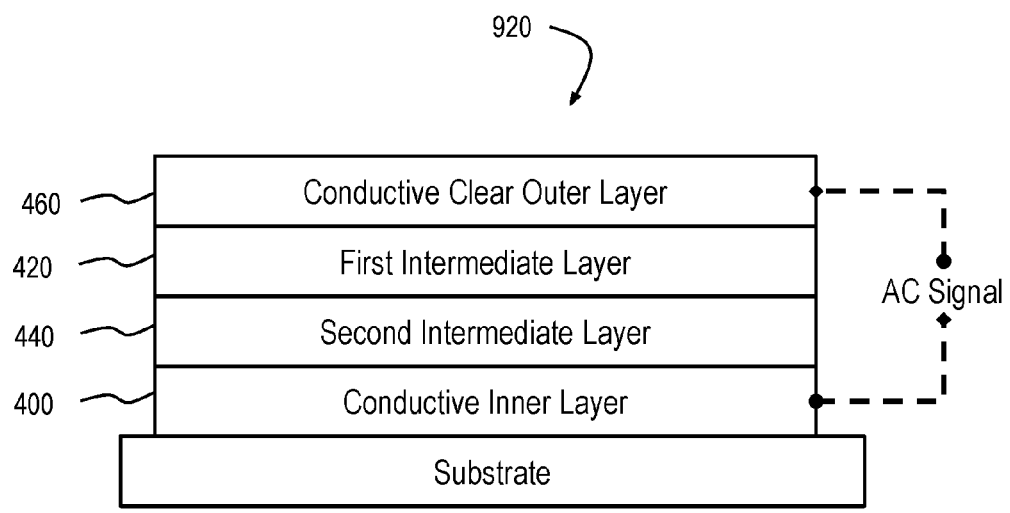
FIG. 2 is a schematic layer diagram of an EL lamp according to another embodiment of the present invention.

In the discussion that follows, like reference numerals are used to refer to like elements and structures in the various figures. Also, the terms "transparent" and "clear" generally refer to a layered material's ability to allow light to pass through without significant absorption and includes translucent characteristics. For the purpose of discussion, as used herein the terms "film", "layer" and "coating" are used interchangeably to describe an applied layer of material in an EL device.

While this invention has been shown and described with respect to detailed embodiments thereof, it will be understood by those skilled in the art that changes in form and detail thereof may be made without departing from the scope of the claims of the inventions.

In one embodiment, a spray-applied conformal coating 920 comprises, inherently conductive and substantially transparent outer layer 460 comprising 2-12% by weight of an outer layer conductive component, 55-80% by weight of a reducer solvent component to assist in the deposition and post-deposition flow of outer layer 460 and 10-30% by weight of a film-forming binder component that forms a film that flows evenly and consistently when atomized onto the surface of an object; an inherently conductive inner layer 400 comprising 40-75% by weight of the reducer solvent component, 20-35% by weight of the binder component, 20-50% by weight of an inner layer conductive component; a first intermediate layer 420, being disposed between the inner and outer layers 400, 460, and further comprising, 45-80% by weight of the reducer solvent component, 10-35% by weight of the binder component, 20-50% by weight of a high-dielectric pigment component, the high-dielectric pigment component, the first intermediate layer 420 being adapted to insulate the outer layer 460 from the inner layer 400, where the film flows to a smooth film that completely covers inner layer 400 so as not to allow a direct electrical connection between conductive layers 400, 460; a second intermediate layer 440, being disposed between the inner and outer layers 400, 460, and further comprising 40-80% by weight of the reducer solvent component, 10-35% by weight of the binder component, 20-50% by weight of an electroluminescent pigment component, the second intermediate layer 460 being adapted to flow after deposition in a manner where the electroluminescent pigment is dispersed in an even and uniform layer as the film cures to provide a uniform lighting effect when energized.

In one embodiment, a spray-applied conformal coating 920 comprises, inherently conductive and substantially transparent outer layer 460 comprising 2-12% by weight of an outer layer conductive component, 55-80% by weight of a reducer solvent component to assist in the deposition and post-deposition flow of outer layer 460, the reducer solvent component including any one or more of, toluene, xylene, acetone, naphtha, mineral spirits, methyl ethyl ketone, acetone, water, ethanol, isopropyl alcohol, n-butyl alcohol, methanol, ethyl benzene, cumene, Solane, n-propyl acetate, methyl acetate, methyl cyclohexane, p-Trifluoromethylphenyl chloride, and p-Chlorobenzotrifluoride, or other volatile solvent, typically in the ratio of 15-%30% by weight ethanol, 15-25% by weight methyl acetate, 15-25% by weight p-Chlorobenzotrifluoride, and 15-25% by weight water and 10-30% by weight of a film-forming binder component that forms a film that flows evenly and consistently when atomized onto the surface of an object, outer layer 460 having a thickness in the range of 0.0002" to 0.0006", outer layer 460 having a resistivity of less than 2000 ohm/square meter; inherently conductive inner layer 400 comprises 40-75% by weight of the reducer solvent component, 20-35% by weight of the binder component, 20-50% by weight of an inner layer conductive component inner layer 400 having a thickness in the range of 0.0005" to 0.002"; outer layer 460 having a resistivity of less than 20 ohm/square meter; first intermediate layer 420, is disposed between inner and outer layers 400, 460, and further comprises 45-80% by weight of the reducer solvent component, 10-35% by weight of the binder component, 20-50% by weight of a high-dielectric pigment component, the high-dielectric pigment component including any one or more of barium titanate, strontium titanate, titanium dioxide, lead zirconate titanate, tantalum oxide, aluminum oxide, or other high-dielectric solids, first intermediate layer 420 having a thickness in the range of 0.0005" to 0.002", first intermediate layer 420 is adapted to insulate outer layer 460 from inner layer 400, where the film flows to a smooth film that completely covers the inner layer so as not to allow a direct electrical connection between conductive layers 400, 460; second intermediate layer 440, is disposed between inner and outer layers 400, 460, and further comprises 40-80% by weight of the reducer solvent component, 10-35% by weight of the binder component, 20-50% by weight of an electroluminescent pigment component, the electroluminescent pigment component including any one or more of metal-doped zinc sulfide phosphors, metal-doped zinc selenide phosphors, metal-doped or native crystalline oxides such as $Ga_2O_3$, $ZnGa_2O_4$, $CaGa_2O_4$, $Zn_2SiO_7$, $Zn_2SiO_4$, $Y_2SIO_5$, and oxide phosphors of Sr, Ga, Ba, and Eu in some combination, or other electroluminescent phosphors, second intermediate layer 440 is adapted to flow after deposition in a manner where the electroluminescent pigment is dispersed in an even and uniform layer as the film cures to provide a uniform lighting effect when energized.

In one embodiment, the outer layer conductive component comprises a conductive pigment component; the inner layer conductive component comprises an inherently conductive polymer component.

In one embodiment, the inherently conductive polymer component comprises PEDOT:PSS; the conductive pigment component includes any one or more of silver flakes, silver nanowire, silver nanoparticles, copper flakes, copper nanowire, copper nanoparticles, nickel flakes, nickel nanowire, nickel nanoparticles, silver-coated copper flakes, silver-coated copper nanowire, carbon nanotubes, graphene, metal-coated particles, or other inherently conductive particles, typically silver flakes or silver-coated copper flakes.

In one embodiment, the outer layer conductive component comprises an inherently conductive polymer component; the inner layer conductive component comprises a conductive pigment component.

In one embodiment, the inherently conductive polymer component comprises PEDOT:PSS; the conductive pigment component includes any one or more of silver flakes, silver nanowire, silver nanoparticles, copper flakes, copper nanowire, copper nanoparticles, nickel flakes, nickel nanowire, nickel nanoparticles, silver-coated copper flakes, silver-coated copper nanowire, carbon nanotubes, graphene, metal-coated particles, or other inherently conductive particles, typically silver flakes or silver-coated copper flakes.

In one embodiment, the film-forming binder component is compatible with an inherently conductive polymer component; the reducer solvent component is functionally compatible with, the film-forming binder component, and the inherently conductive polymer component.

In one embodiment, outer layer 460 further comprises 3%-5% by weight of the outer layer conductive component.

In one embodiment, outer layer further 460 comprises 70-75% by weight of the reducer solvent component.

In one embodiment, the binder component of outer layer 460 including any one or more of an acrylic, polyurethane, vinyl, latex, cellulose acetate butyrate or other binder, preferably a polyurethane or acrylic.

In one embodiment, outer layer 460 further comprises 10-15% by weight of the film-forming binder component.

In one embodiment, outer layer 460 has a thickness of substantially 0.0005".

In one embodiment, the reducer solvent component of inner layer 400 further comprises 50-70% n-butyl acetate and 30-50% xylene.

In one embodiment, the reducer solvent component of inner layer 400 further comprises or 50-70% methyl acetate and 30-50% xylene.

In one embodiment, inherently conductive inner layer 400 further comprises 55%-65% by weight of the reducer solvent component.

In one embodiment, inner layer 400 further comprises 20-25% by weight of the binder component.

In one embodiment, the binder component of inner layer 400 further comprises an acrylic.

In one embodiment, the binder component of inner layer 400 further comprises a polyurethane.

In one embodiment, inner layer 400 further comprises 30%-40% by weight of the inner layer conductive component.

In one embodiment, inner layer 400 has a thickness of substantially 0.001".

In one embodiment, the reducer solvent component of first intermediate layer 420 is 50-70% n-butyl acetate and 30-50% xylene.

In one embodiment, the reducer solvent component of first intermediate layer 420 is 50-70% methyl acetate and 30-50% xylene.

In one embodiment, first intermediate layer 420 further comprises 60%-65% by weight of the reducer solvent component.

In one embodiment, first intermediate layer 420 further comprises 15-20% by weight of the binder component.

In one embodiment, the binder component of first intermediate layer 420 is acrylic.

In one embodiment, the binder component of first intermediate layer 420 is polyurethane.

In one embodiment, first intermediate layer 420 further comprises 35%-45% by weight of the high-dielectric pigment component.

In one embodiment, first intermediate layer 420 has a thickness of substantially 0.001".

In one embodiment, the reducer solvent component of second intermediate layer 440 is 50-70% n-butyl acetate and 30-50% xylene.

In one embodiment, the reducer solvent component of second intermediate layer 440 is 50-70% methyl acetate and 30-50% xylene.

In one embodiment, second intermediate layer 440 further comprises 60%-65% by weight of the reducer solvent component.

In one embodiment, second intermediate layer 440 further comprises 15-20% by weight of the binder component.

In one embodiment, the binder component of second intermediate layer 440 is an acrylic.

In one embodiment, the binder component of second intermediate layer 440 is a polyurethane.

In one embodiment, second intermediate layer 440 further comprises 35%-45% by weight of an electroluminescent pigment component.

In one embodiment, the electroluminescent pigment component has a thickness of substantially 0.002".

In one embodiment, the electroluminescent pigment component of second intermediate layer 440 has a thickness of substantially 0.002".

In one embodiment, outer layer 460 has a thickness in the range of 0.001" to 0.002" outer layer 460 has a resistivity of less than 100 ohm/square meter.

In one embodiment, inner layer 400 has a thickness in the range of 0.0002" to 0.001" inner layer 400 has a resistivity of less than 2000 ohm/square meter.

In one embodiment (FIG. 1), first intermediate layer 420 is disposed between inner layer 400 and second intermediate layer 440, and second intermediate layer 440 is disposed between outer layer 460 and first intermediate layer 420.

Figure 3:
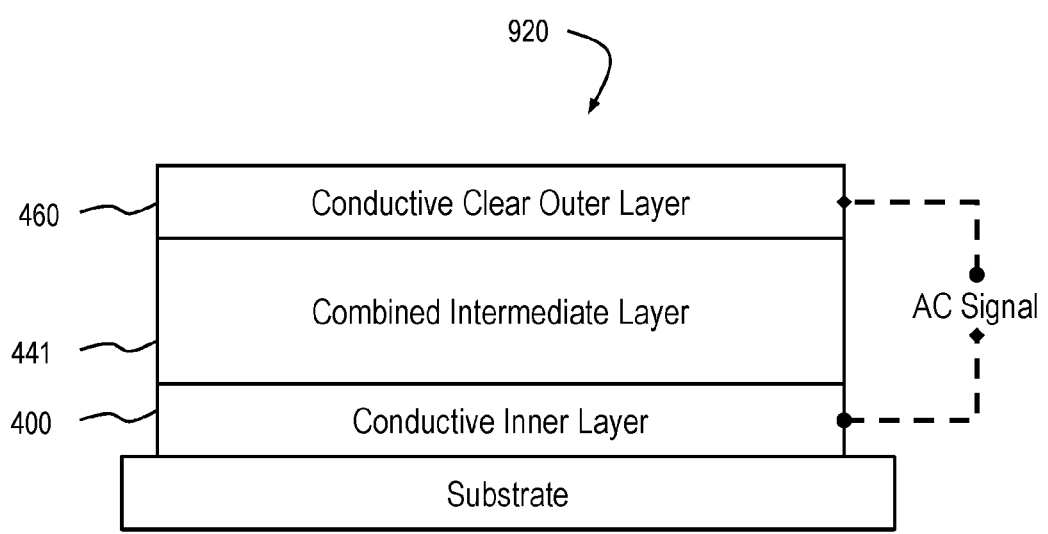
FIG. 3 is a schematic layer diagram of an EL lamp according to yet another embodiment of the present invention.

In one embodiment (FIG. 3), first intermediate layer 420 and second intermediate layer 440 are blended into combined intermediate layer 441 and sprayed simultaneously; combined intermediate layer 441 comprises, 40-80% by weight of the reducer solvent component, 10-35% by weight of the binder component, 10-30% by weight of an electroluminescent pigment component, 10-25% by weight of a high-dielectric pigment component, combined intermediate layer 441 has a thickness in the range of 0.002" to 0.004", combined intermediate layer 441 is adapted to flow after deposition in a manner where the electroluminescent pigment is dispersed in an even and uniform layer as the film cures to provide a uniform lighting effect when energized, and where the film flows to a smooth film that completely covers inner layer 400 so as not to allow a direct electrical connection between conductive layers 400 & 460.

In one embodiment, the reducer solvent component is 50-70% n-butyl acetate and 30-50% xylene.

In one embodiment, the reducer solvent component is 50-70% methyl acetate and 30-50% xylene.

In one embodiment, combined intermediate layer 441 comprises 60%-65% by weight of the reducer solvent component.

In one embodiment, combined intermediate layer 441 comprises 15-20% by weight of the reducer solvent component.

In one embodiment, the reducer solvent component of combined intermediate layer 441 comprises an acrylic.

In one embodiment, the reducer solvent component of combined intermediate layer 441 comprises a polyurethane binder.

In one embodiment, combined intermediate layer 441 comprises 15%-25% by weight of an electroluminescent pigment component.

In one embodiment, combined intermediate layer 441 comprises 15%-20% by weight of a high-dielectric pigment component.

In one embodiment, combined intermediate layer 441 has a thickness of substantially 0.002".

In one embodiment, the various layers are applied by High Pressure Low Volume spray techniques, wherein each coating is atomized by compressed air and deposited on the conformal substrate in this manner, and the coating then flows after deposition to the proper film thickness.

In one embodiment, the various layers are applied by aerosol spray techniques, wherein each coating is atomized by a propellant inside of a can, and deposited on the conformal substrate in this manner, and the coating then flows after deposition to the proper film thickness.

In one embodiment, the propellant inside of the can comprises propane.

In one embodiment, the various layers are applied by electrostatic spray techniques, where each coating is atomized by compressed air and deposited on the charged surface of the conformal substrate in this manner, and the coating then flows after deposition to the proper film thickness.

What is claimed is:

1. A spray-applied conformal coating comprising:
   a conductive component;
   a reducer solvent component;
   a high-dielectric pigment component;
   an electroluminescent pigment component;
   a film-forming binder component;

an inherently conductive and substantially transparent
outer layer comprising
said conductive component,
said reducer solvent component,
and said film-forming binder component;
an inherently conductive inner layer comprising
said reducer solvent component,
said binder component,
and said conductive component;
a first intermediate layer, being disposed between the inner and outer layers, and further comprising,
said reducer solvent component,
said binder component,
and said high-dielectric pigment component,
said first intermediate layer being adapted to insulate said outer layer from said inner layer, where the film flows to a smooth film that completely covers the inner layer so as not to allow a direct electrical connection between conductive layers;
a second intermediate layer, being disposed between the inner and outer layers, and further comprising
said reducer solvent component,
said binder component,
and said electroluminescent pigment component;
said second intermediate layer being adapted to flow after deposition in a manner where the electroluminescent pigment is dispersed in an even and uniform layer as the film cures to provide a uniform lighting effect when energized.

2. A spray-applied conformal coating comprising:
an inherently conductive and substantially transparent outer layer comprising
2-12% by weight of an outer layer conductive component,
55-80% by weight of a reducer solvent component to assist in the deposition and post-deposition flow of the outer layer
and 10-30% by weight of a film-forming binder component that forms a film that flows evenly and consistently when atomized onto the surface of an object;
an inherently conductive inner layer comprising
40-75% by weight of said reducer solvent component,
20-35% by weight of said binder component,
20-50% by weight of an inner layer conductive component;
a first intermediate layer, being disposed between the inner and outer layers, and further comprising,
45-80% by weight of said reducer solvent component,
10-35% by weight of said binder component,
20-50% by weight of a high-dielectric pigment component,
said first intermediate layer being adapted to insulate said outer layer from said inner layer, where the film flows to a smooth film that completely covers the inner layer so as not to allow a direct electrical connection between conductive layers;
a second intermediate layer, being disposed between the inner and outer layers, and further comprising
40-80% by weight of said reducer solvent component,
10-35% by weight of said binder component,
20-50% by weight of an electroluminescent pigment component,
said second intermediate layer being adapted to flow after deposition in a manner where the electroluminescent pigment is dispersed in an even and uniform layer as the film cures to provide a uniform lighting effect when energized.

3. A spray-applied conformal coating comprising:
an inherently conductive and substantially transparent outer layer comprising
2-12% by weight of an outer layer conductive component,
55-80% by weight of a reducer solvent component to assist in the deposition and post-deposition flow of the outer layer, said reducer solvent component including any one or more of,
toluene, xylene, acetone, naphtha, mineral spirits, methyl ethyl ketone, acetone, water, ethanol, isopropyl alcohol, n-butyl alcohol, methanol, ethyl benzene, cumene, Solane, n-propyl acetate, methyl acetate, methyl cyclohexane, p-Trifluoromethylphenyl chloride, and p-Chlorobenzotrifluoride, or other volatile solvent, typically in the ratio of 15-%30% by weight ethanol, 15-25% by weight methyl acetate, 15-25% by weight p-Chlorobenzotrifluoride, and 15-25% by weight water
and 10-30% by weight of a film-forming binder component that forms a film that flows evenly and consistently when atomized onto the surface of an object,
said outer layer having a thickness in the range of 0.0002" to 0.0006",
said outer layer having a resistivity of less than 2000 ohm/square meter;
an inherently conductive inner layer comprising
40-75% by weight of said reducer solvent component,
20-35% by weight of said binder component,
20-50% by weight of an inner layer conductive component
said inner layer having a thickness in the range of 0.0005" to 0.002";
said outer layer having a resistivity of less than 20 ohm/square meter;
a first intermediate layer, being disposed between the inner and outer layers, and further comprising
45-80% by weight of said reducer solvent component,
10-35% by weight of said binder component,
20-50% by weight of a high-dielectric pigment component, said high-dielectric pigment component including any one or more of
barium titanate, strontium titanate, titanium dioxide, lead zirconate titanate, tantalum oxide, aluminum oxide, or other high-dielectric solids,
said first intermediate layer having a thickness in the range of 0.0005" to 0.002",
said first intermediate layer being adapted to insulate said outer layer from said inner layer, where the film flows to a smooth film that completely covers the inner layer so as not to allow a direct electrical connection between conductive layers;
a second intermediate layer, being disposed between the inner and outer layers, and further comprising
40-80% by weight of said reducer solvent component,
10-35% by weight of said binder component,
20-50% by weight of an electroluminescent pigment component, said electroluminescent pigment component including any one or more of
metal-doped zinc sulfide phosphors, metal-doped zinc selenide phosphors, metal-doped or native crystalline oxides such as Ga2O3, ZnGa2O4, CaGa2O4, Zn2SiO7, Zn2SiO4, Y2SIO5, and oxide phosphors of Sr, Ga, Ba, and Eu in some combination, or other electroluminescent phosphors,
said second intermediate layer being adapted to flow after deposition in a manner where the electroluminescent pigment is dispersed in an even and uniform layer as the film cures to provide a uniform lighting effect when energized.

4. The spray-applied conformal coating of claim 3 further comprising:
said outer layer conductive component comprises
a conductive pigment component;
said inner layer conductive component comprises
an inherently conductive polymer component.

5. The spray-applied conformal coating of claim 4 further comprising:
the inherently conductive polymer component comprises PEDOT:PSS;
said conductive pigment component includes any one or more of
silver flakes, silver nanowire, silver nanoparticles, copper flakes, copper nanowire, copper nanoparticles, nickel flakes, nickel nanowire, nickel nanoparticles, silver-coated copper flakes, silver-coated copper nanowire, carbon nanotubes, graphene, metal-coated particles, or other inherently conductive particles, typically silver flakes or silver-coated copper flakes.

6. The spray-applied conformal coating of claim 3 further comprising:
said outer layer conductive component comprises
an inherently conductive polymer component;
said inner layer conductive component comprises
a conductive pigment component.

7. The spray-applied conformal coating of claim 6 further comprising:
the inherently conductive polymer component comprises PEDOT:PSS;
said conductive pigment component includes any one or more of
silver flakes, silver nanowire, silver nanoparticles, copper flakes, copper nanowire, copper nanoparticles, nickel flakes, nickel nanowire, nickel nanoparticles, silver-coated copper flakes, silver-coated copper nanowire, carbon nanotubes, graphene, metal-coated particles, or other inherently conductive particles, typically silver flakes or silver-coated copper flakes.

8. The spray-applied conformal coating of claim 3 further comprising:
the film-forming binder component being compatible with an inherently conductive polymer component;
the reducer solvent component being functionally compatible with,
the film-forming binder component,
and the inherently conductive polymer component.

9. The spray-applied conformal coating of claim 3 further comprising:
the outer layer further comprises 3%-5% by weight of the outer layer conductive component.

10. The spray-applied conformal coating of claim 3 further comprising:
the outer layer further comprises 70-75% by weight of the reducer solvent component.

11. The spray-applied conformal coating of claim 3 further comprising:
said binder component of said outer layer including any one or more of
an acrylic, polyurethane, vinyl, latex, cellulose acetate butyrate or other binder, preferably a polyurethane or acrylic.

12. The spray-applied conformal coating of claim 3 further comprising:
the outer layer further comprises
10-15% by weight of the film-forming binder component.

13. The spray-applied conformal coating of claim 3 further comprising:
said outer layer having a thickness of substantially 0.0005".

14. The spray-applied conformal coating of claim 3 further comprising:
said reducer solvent component of said inner layer further comprising
50-70% n-butyl acetate and 30-50% xylene.

15. The spray-applied conformal coating of claim 3 further comprising:
said reducer solvent component of said inner layer further comprising
50-70% methyl acetate and 30-50% xylene.

16. The spray-applied conformal coating of claim 3 further comprising:
said inherently conductive inner layer further comprising
55%-65% by weight of said reducer solvent component.

17. The spray-applied conformal coating of claim 3 further comprising:
said inner layer further comprising 20-25% by weight of said binder component.

18. The spray-applied conformal coating of claim 3 further comprising:
said binder component of said inner layer further comprising
an acrylic.

19. The spray-applied conformal coating of claim 3 further comprising:
said binder component of said inner layer further comprising
a polyurethane.

20. The spray-applied conformal coating of claim 3 further comprising:
said inner layer further comprising
30%-40% by weight of said inner layer conductive component.

21. The spray-applied conformal coating of claim 3 further comprising:
said inner layer having a thickness of substantially 0.001".

22. The spray-applied conformal coating of claim 3 further comprising:
said reducer solvent component of said first intermediate layer being
50-70% n-butyl acetate and 30-50% xylene.

23. The spray-applied conformal coating of claim 3 further comprising:
said reducer solvent component of said first intermediate layer being
50-70% methyl acetate and 30-50% xylene.

24. The spray-applied conformal coating of claim 3 further comprising:
said first intermediate layer further comprising
60%-65% by weight of said reducer solvent component.

25. The spray-applied conformal coating of claim 3 further comprising:
said first intermediate layer further comprising 15-20% by weight of said binder component.

26. The spray-applied conformal coating of claim 3 further comprising:
said binder component of said first intermediate layer being
acrylic.

27. The spray-applied conformal coating of claim 3 further comprising:
said binder component of said first intermediate layer being
polyurethane.

28. The spray-applied conformal coating of claim 3 further comprising:
said first intermediate layer further comprising 35%-45% by weight of said high-dielectric pigment component.

29. The spray-applied conformal coating of claim 3 further comprising:
said first intermediate layer having a thickness of substantially 0.001".

30. The spray-applied conformal coating of claim 3 further comprising:
said reducer solvent component of said second intermediate layer being
50-70% n-butyl acetate and 30-50% xylene.

31. The spray-applied conformal coating of claim 3 further comprising:
said reducer solvent component of said second intermediate layer being
50-70% methyl acetate and 30-50% xylene.

32. The spray-applied conformal coating of claim 3 further comprising:
said second intermediate layer further comprising 60%-65% by weight of said reducer solvent component.

33. The spray-applied conformal coating of claim 3 further comprising:
said second intermediate layer further comprising 15-20% by weight of said binder component.

34. The spray-applied conformal coating of claim 3 further comprising:
said binder component of said second intermediate layer being
an acrylic.

35. The spray-applied conformal coating of claim 3 further comprising:
said binder component of said second intermediate layer being
a polyurethane.

36. The spray-applied conformal coating of claim 3 further comprising:
said second intermediate layer further comprising 35%-45% by weight of an electroluminescent pigment component.

37. The spray-applied conformal coating of claim 3 further comprising:
said electroluminescent pigment component having a thickness of substantially 0.002".

38. The spray-applied conformal coating of claim 3 further comprising:
said electroluminescent pigment component of said second intermediate layer having a thickness of substantially 0.002".

39. The spray-applied conformal coating of claim 3 further comprising:
said outer layer having a thickness in the range of 0.001" to 0.002"
said outer layer having a resistivity of less than 100 ohm/square meter.

40. The spray-applied conformal coating of claim 3 further comprising:
said inner layer having a thickness in the range of 0.0002" to 0.001"
said inner layer having a resistivity of less than 2000 ohm/square meter.

41. The spray-applied conformal coating of claim 3 further comprising:
said first intermediate layer being disposed between said inner layer and said second intermediate layer;
said second intermediate layer being disposed between said outer layer and said first intermediate layer.

42. The spray-applied conformal coating of claim 3 further comprising:
said first intermediate layer and said second intermediate layer are blended into a combined intermediate layer and sprayed simultaneously;
said combined intermediate layer comprising,
40-80% by weight of said reducer solvent component,
10-35% by weight of said binder component,
10-30% by weight of an electroluminescent pigment component,
10-25% by weight of a high-dielectric pigment component,
said combined intermediate layer having a thickness in the range of 0.002" to 0.004",
said combined intermediate layer being adapted to flow after deposition in a manner where the electroluminescent pigment is dispersed in an even and uniform layer as the film cures to provide a uniform lighting effect when energized, and where the film flows to a smooth film that completely covers the inner layer so as not to allow a direct electrical connection between conductive layers.

43. The spray-applied conformal coating of claim 42 further comprising:
said reducer solvent component being
50-70% n-butyl acetate and 30-50% xylene.

44. The spray-applied conformal coating of claim 42 further comprising:
said reducer solvent component being
50-70% methyl acetate and 30-50% xylene.

45. The spray-applied conformal coating of claim 42 further comprising:
said combined intermediate layer comprising 60%-65% by weight of said reducer solvent component.

46. The spray-applied conformal coating of claim 42 further comprising:
said combined intermediate layer comprising 15-20% by weight of said reducer solvent component.

47. The spray-applied conformal coating of claim 42 further comprising:
said reducer solvent component of said combined intermediate layer comprising
an acrylic.

48. The spray-applied conformal coating of claim 42 further comprising:
said reducer solvent component of said combined intermediate layer comprising
a polyurethane binder.

49. The spray-applied conformal coating of claim 42 further comprising:
said combined intermediate layer comprising 15%-25% by weight of an electroluminescent pigment component.

50. The spray-applied conformal coating of claim 42 further comprising:
said combined intermediate layer comprising 15%-20% by weight of a high-dielectric pigment component.

51. The spray-applied conformal coating of claim 42 further comprising:
said combined intermediate layer having a thickness of substantially 0.002".

52. The spray-applied conformal coating of claim 3 wherein
said layers are applied by High Pressure Low Volume spray techniques, wherein each coating is atomized by compressed air and deposited on the conformal substrate in this manner, and the coating then flows after deposition to the proper film thickness.

53. The spray-applied conformal coating of claim 52 further comprising:
said propellant inside of said can, comprises propane.

54. The spray-applied conformal coating of claim 3 wherein
said layers are applied by aerosol spray techniques, wherein each coating is atomized by a propellant inside of a can, and deposited on the conformal substrate in this manner, and the coating then flows after deposition to the proper film thickness.

55. The spray-applied conformal coating of claim 3 wherein
said layers are applied by electrostatic spray techniques, where each coating is atomized by compressed air and deposited on the charged surface of the conformal substrate in this manner, and the coating then flows after deposition to the proper film thickness.

* * * * *